F. SIMEK.
GARMENT FASTENER.
APPLICATION FILED APR. 26, 1918.
1,319,659. Patented Oct. 21, 1919.
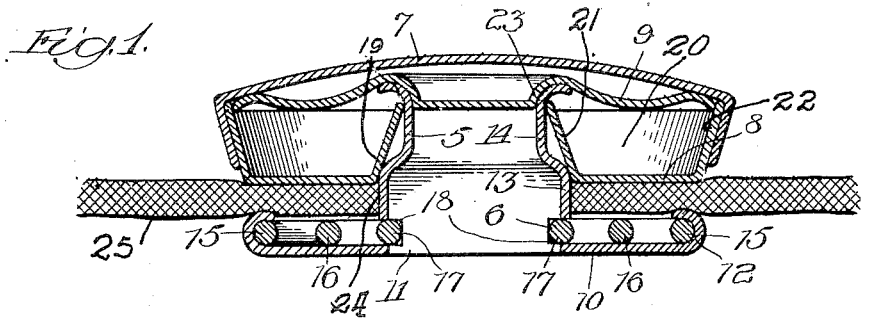
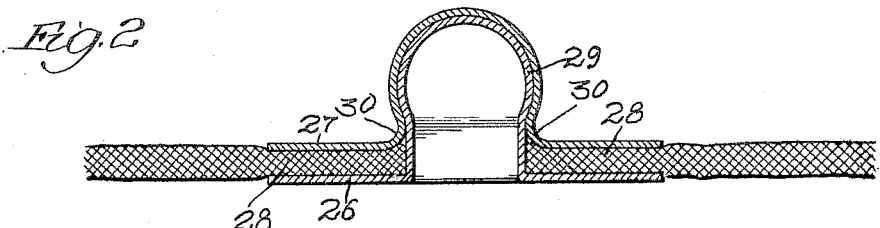
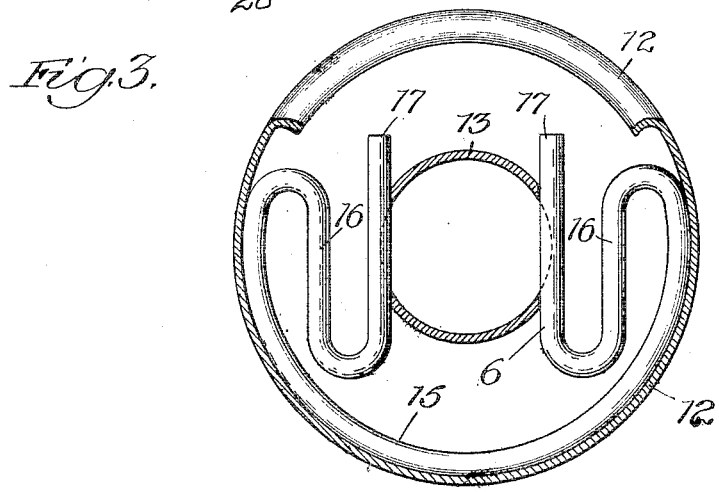
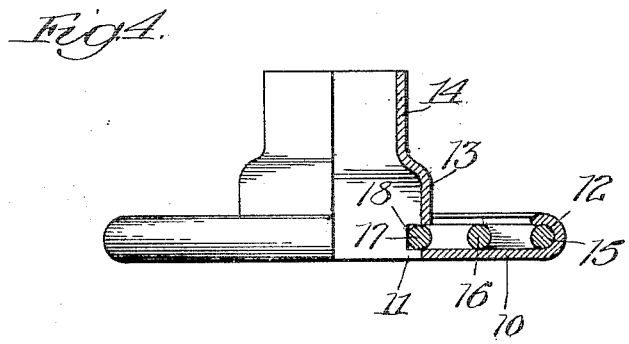
Witnesses:
Inventor.
Frank Simek,

UNITED STATES PATENT OFFICE.

FRANK SIMEK, OF CHICAGO, ILLINOIS, ASSIGNOR TO COLUMBIA FASTENER COMPANY, OF CHICAGO, ILLINOIS, A CORPORATION OF ILLINOIS.

GARMENT-FASTENER.

1,319,659.     Specification of Letters Patent.     Patented Oct. 21, 1919.

Application filed April 26, 1918. Serial No. 230,859.

*To all whom it may concern:*

Be it known that I, FRANK SIMEK, a subject of the Emperor of Austria, and who has taken out his first papers for citizenship in the United States, residing at Chicago, in the county of Cook and State of Illinois, have invented a new and useful Improvement in Garment-Fasteners, of which the following is a specification.

My invention relates, more particularly, to stud and socket snap-fasteners for gloves, of the type in which the socket portion of the fastener, includes as elements thereof, a resilient device to engage the stud member of the fastener, and a member provided with a tubular section which pierces the portion of the article to which the socket-portion is attached; and my object, generally stated, is to provide a fastener of this type which shall be formed of the minimum number of parts, and be satisfactory in operation.

Referring to the accompanying drawing, Figure 1 is a view in sectional elevation of the socket-portion of a fastener constructed in accordance with my invention, showing it as applied to position on a glove. Fig. 2 is a similar view of the stud-portion of the fastener in position on the glove. Fig. 3 is a plan view of one of the elements forming the socket-portion of the fastener, a portion thereof being in section; and Fig. 4 a view in elevation, partly sectional, of the part shown in Fig. 3.

The socket-portion of the fastener is formed of a tube-equipped portion 5, a spring-device 6 carried thereby, an outer flanged disk 7, a washer 8, and a former disk 9 all interlocked together.

The portion 5 which is of sheet metal is formed of the plate-portion 10 containing a central opening 11 and having an inwardly-rolled flange 12 at its outer circumference, and a tubular, stud-forming, section 13 formed integrally with the plate-portion 10 and rising upwardly therefrom as shown, the upper end of the section 13 being of reduced diameter, as indicated at 14.

The spring-device 6 is provided for presenting in the interior of the socket-portion of the fastener, a resilient member which releasably engages with the stud-portion of the fastener hereinafter described, for releasably holding the socket and stud-portion together. In the particular form shown the spring-device 6 is formed of a single piece of spring wire presenting the body-portion 15 and the reversely bent portions 16 presenting the free sections 17. The body-portion 15 is adapted to lie against the upper side of the plate-portion 10 and conformably fits the flange 12 which preferably closely fits against the spring partially encircling it as shown, and the free sections 17 extend normally under the action of the spring-device, into diametrically-opposed slots 18 in the tubular section 13 and against the walls of this section, as shown in Fig. 3.

The outer flanged disk 7 of sheet metal, houses the washer 8 and former 9, the washer 8, which is of sheet metal and is centrally apertured at 19, having an annular channel 20 along its upper face, with its inner and outer circular walls 21 and 22 flaring, respectively, toward and away from the center of the washer, and the former 9 which is preferably of sheet steel, being formed with the annular curved forming-section 23.

In assembling the parts described to produce the socket-portion of the fastener, a hole 24 may be first punched in the garment where the fastener is to be applied, the garment, as for example a glove, being represented at 25, and the portion 5 with spring-device 6 assembled therewith as stated, inserted at its section 13 through the hole 24 to position the spring-carrying plate portion 10 at one side of the garment. The washer 8 is then slipped over the protruding end of the tubular section 13 to the position shown in Fig. 1; the former plate 9 applied to the upper end of the tubular section 13, and the outer disk 7 applied to the top of the plate 9 with its flange telescoping the outer circular wall 22 of the washer 8. Force is then applied in any suitable manner from opposite sides of the elements, thus preliminarily assembled, to squeeze them together, and interlock them, the outer end of the tubular section 13 in thus being operated on riding against the curved forming surface 23 of the former section, which causes the end of the tube 13 to curl outwardly and interlock with the inner circular wall 21 of the washer 8, the material of the garment to which the socket-portion is applied becoming firmly clamped between the plate-portion of the member 5 and the washer 8, as shown in Fig. 1. If desired, by reason of the construction of the portion 13, the hole the load represented by the body and its contents and to so distribute and absorb jars or shocks applied to single wheels or pairs of wheels as to convey the same to the body as a unit rather than to any particular zone thereof. The body is therefore carried with its load in an easy comfortable riding movement regardless of the roughness or unevenness of the road surface which may be traversed, and at the same time the compensatory action of the various elements serve to relieve any particular portion of the running gear or frame of the car from localized shock and jars.

As indicated in each of the several essential elements of the structure including those of the longitudinal side members, the transverse member and the cross heads by which connection is made between the terminals of the transverse member and the extremities of the elements of the longitudinal members is transversely resilient in a vertical plane and consists of a leaf spring, those of the side members being designed to resist central or intermediate upward flexure while the transverse elements and cross heads are arranged to resist central or intermediate downward flexure. Also it will be observed that the transverse elements are tiltably or rockably mounted at the point of imposition of the load and are also capable of pivotal swinging movement horizontally to allow for any strain in that direction while the suspending links forming the connections between the terminals of the cross heads and the extremities of the elements of the side members allow a limited forward and rearward bodily movement of said cross heads.

Having described the invention I claim:—

1. A suspension load distributing structure for vehicle bodies having side longitudinal members consisting of terminally supporting series of axle supported elements and an intermediate transverse connecting member consisting of a resilient element connecting the adjacent terminals of the elements of the side members.

2. A suspension load distributing structure for vehicle bodies having side longitudinal members consisting of terminally supporting series of axle supported elements and an intermediate transverse connecting member consisting of a pivotal resilient element connecting the adjacent terminals of the elements of the side members.

3. A suspension load distributing structure for vehicle bodies having side longitudinal members consisting of terminally supporting series of axle supported elements and an intermediate transverse member connecting the adjacent terminals of the longitudinal members and consisting of a resilient element having terminal resilient cross heads suspended at their extremities by the adjacent terminals of the elements of the longitudinal members.

4. A suspension load distributing structure for vehicle bodies having side longitudinal members consisting of terminally load supporting series of spring axle supported elements and an intermediate transverse connecting member consisting of a pivotal resilient spring element having terminal resilient cross heads suspended at their extremities by the adjacent terminals of the elements of the longitudinal members.

5. A suspension load distributing structure for vehicle bodies having side longitudinal members consisting of series of spring axle supported elements and a transverse resilient element terminally connected with adjacent ends of the opposite longitudinal elements.

6. A suspension load distributing structure for vehicle bodies having side longitudinal members consisting of series of spring axle supported elements and a transverse member consisting of a resilient element terminally connected by resilient cross heads with adjacent ends of the opposite longitudinal elements.

7. A suspension load distributing structure for vehicle bodies having side longitudinal members consisting of series of axle supported elements and a transverse resilient element terminally connected with adjacent ends of the opposite longitudinal elements, the load being imposed upon the remote ends of the terminal elements of the longitudinal series and the centers of the transverse element and the latter having a rocking or tilting movement relative to the point of imposition of the load.

8. A suspension load distributing structure for vehicle bodies having side longitudinal members consisting of series of resilient axle supported elements and a transverse resilient element terminally connected by resilient cross heads with the adjacent ends of the opposite longitudinal elements, the load being imposed upon the remote ends of the terminal elements of the longitudinal series and the center of the transverse element, and the latter having a tilting movement relative to the point of imposition of the load thereon.

In testimony whereof I affix my signature

JOHN KRAKOWIECKI.